United States Patent
Saito et al.

(10) Patent No.: US 6,895,038 B2
(45) Date of Patent: May 17, 2005

(54) COMMUNICATION SYSTEM

(75) Inventors: Joichi Saito, Yokohama (JP); Hideki Shimizu, Tokyo (JP); Naoki Tsubaki, Yokohama (JP); Yuuji Ishida, Fujisawa (JP); Toshinori Suzuki, Tokyo (JP)

(73) Assignees: Hitachi, Ltd. (JP); KDDI Corporation (JP)

(*) Notice: Subject to any disclaimer, the term of this patent is extended or adjusted under 35 U.S.C. 154(b) by 749 days.

(21) Appl. No.: 09/770,819

(22) Filed: Jan. 26, 2001

(65) Prior Publication Data

US 2001/0038664 A1 Nov. 8, 2001

(30) Foreign Application Priority Data

Jan. 28, 2000 (JP) ..................... 2000-020657

(51) Int. Cl.[7] ................... H04B 15/00; H04K 1/00; H04L 27/30
(52) U.S. Cl. ................... 375/148; 375/144
(58) Field of Search ............... 375/144, 145, 375/142, 148, 149, 150, 346, 347, 349; 370/342, 441, 479

(56) References Cited

U.S. PATENT DOCUMENTS 5,467,368 A * 11/1995 Takeuchi et al. ............ 375/148
5,533,012 A * 7/1996 Fukasawa et al. .......... 370/342
6,137,788 A * 10/2000 Sawahashi et al. ......... 370/342
6,192,067 B1 * 2/2001 Toda et al. .................. 375/144
6,574,270 B1 * 6/2003 Madkour et al. ........... 375/148

FOREIGN PATENT DOCUMENTS

| JP | 08206935 | 8/1996 |
| JP | 08340919 | 12/1996 |

* cited by examiner

Primary Examiner—Phuong Phu
(74) Attorney, Agent, or Firm—Sofer & Haroun, LLP

(57) ABSTRACT

A low-cost communication system utilizing a code division multiple access, which controls scale-up of an apparatus due to the provision of an interference suppressing function in a base transceiver station, prevents the reduction of channel utilization efficiency, and enables a high-quality communication. Conventionally, a signal obtained through an interference cancellation stage process has been processed at subsequent cascade-connected stages. The interference cancellation stage process has been carried out by cascade-connecting several circuits performing the same process in a multi-stage interference-canceling device. However, in the present invention, by performing a demodulation process for generating replica signals, feeding back the replica signals to a correlation circuit for another demodulation process, and repeating the same signal process, the interference cancellation stage process is carried out. Such a configuration enables reduction of hardware.

4 Claims, 9 Drawing Sheets

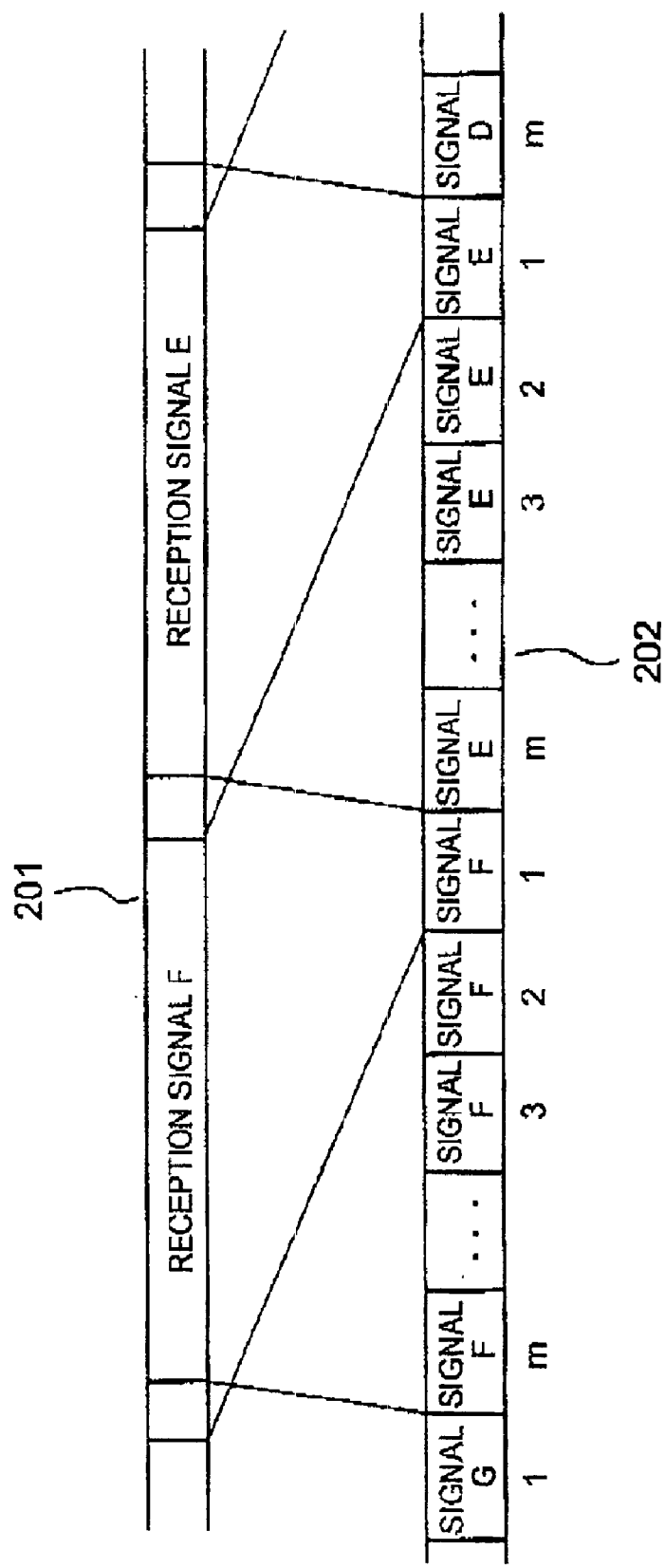

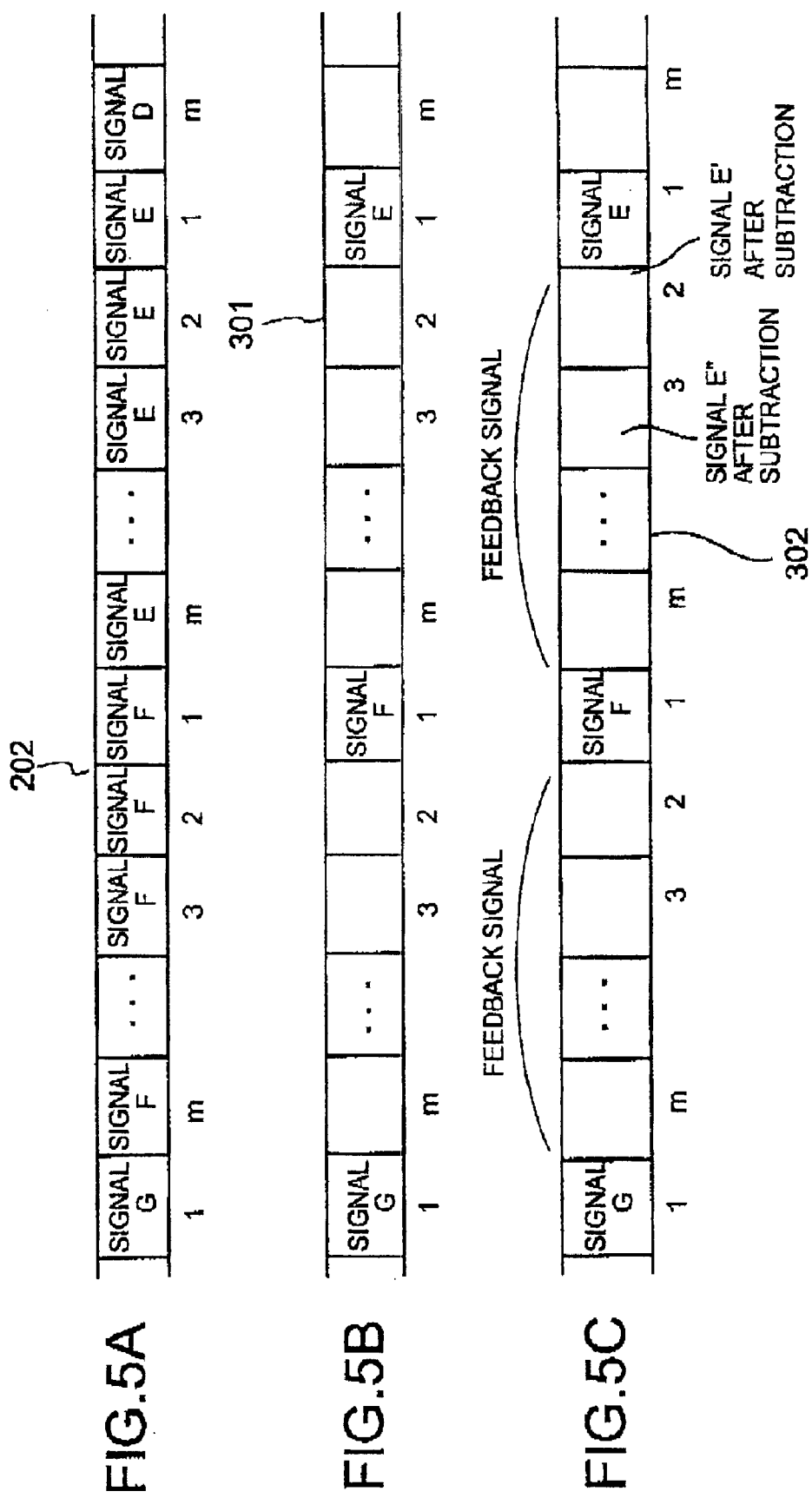

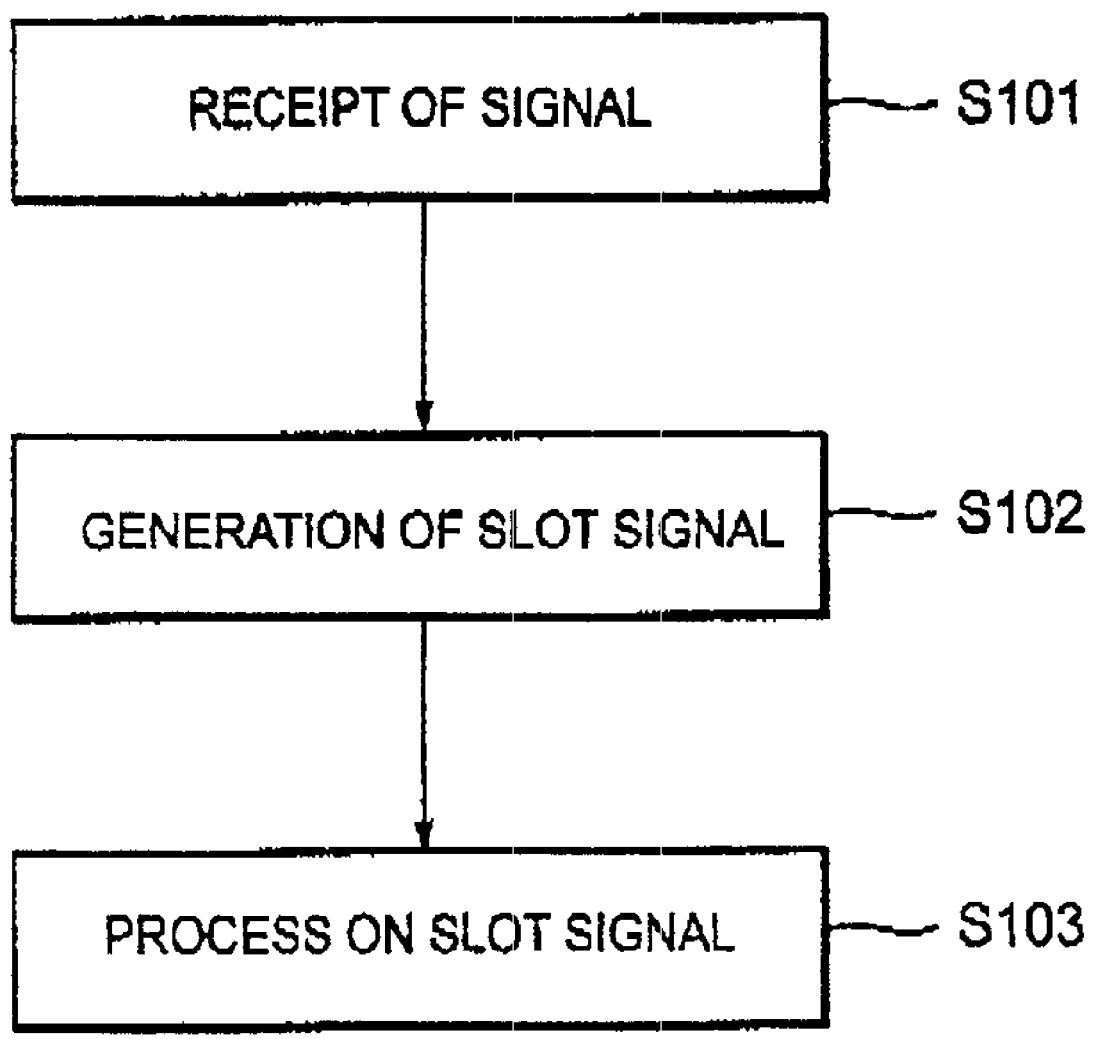

COMMUNICATION SYSTEM

This application claims a priority based on Japanese Patent Application No. 2000-20657 filed on Jan. 28, 2000, the entire contents of which are incorporated herein by reference for all purposes.

BACKGROUND OF THE INVENTION

Field of the Invention

The present invention relates to a communication system and, more particularly, to a radio communication system based on the code division multiple access system.

A radio communication system employing the code division multiple access method has characteristics suitable for mobile communication, i.e., its strength against mutual interference with other systems, its adaptability to a multipath, capability of easy hand-off, excellent secrecy and so on. However, a communication system based on the code division multiple access method is different from other multiple access methods in that a plurality of terminal users existing within the same base station cell simultaneously communicate using the same frequency and the same frequency band. Therefore, a communication system based on the code division multiple access method has the following problem in utilization of a channel. Specifically, the problem is that utilization of a channel can be reduced by interference that occurs when a strong communication signal from a user closer to a base station overlaps another weaker signal in the existence of the far-and-near problem, and interference by one station with another station that is caused by unnecessary transmission power from the first station and so on.

Measures to prevent any reduction of utilization of a channel includes the use of a wide band gain through expansion of the band of a signal, the use of a series of codes having little correlation and the use of power control for solving the far-and-near problem. In particular, power control is effective not only in suppressing unnecessary transmission from a station to limit the transmission power of the station to a required minimum thereby minimizing interference of the station with another station but also in solving the far-and-near problem.

However, even when those measures are taken, it is still difficult to prevent any reduction of the quality of communication resulting from an increase in mutual correlation interference (a reduction in a signal-to-noise ratio) attributable to an increase in the number of users who communicate simultaneously.

An effective measure to solve the above-described problem is interference canceling techniques for eliminating interference from another channel, and various types of interference canceling techniques are being studied. A receiver can predict interference of another user, and the receiver can perform a process to eliminate the interference. Those proposed interference canceling systems include an interference canceling system based on a multi-user reception method which utilizes information of a plurality of user signals to be demodulated from a plurality of users. An interference canceling apparatus utilizing this system performs a demodulation process on signals to be demodulated from a plurality of users, performs a re-spreading process and a synthetic process on the demodulated signals to create replica signals, and performs a subtraction process between the replica signals and multi-wave reception signals to realize a demodulation process which suppresses interference components. The effect of suppressing interference components is improved by performing the interference canceling process using a cascade-connected multi-stage configuration.

For information on interference cancellation of this type, for example, the techniques disclosed in Japanese patent Laid-Open No. 51353/1998 and 190494/1998 are well known.

SUMMARY OF THE INVENTION

In a mobile communication system utilizing code division multiple access as described above, an increase in mutual interference inevitably occurs as a result of an increase in the number of users who simultaneously communicate. Therefore, interference cancellation techniques are indispensable techniques. Among such interference cancellation techniques, multi-user reception type interference cancellation techniques require a signal processing unit for performing a process of suppressing interference components including a plurality of correlators and re-spreaders because they utilize information of a plurality of user signals to be demodulated. The signal processing unit for performing a process of suppressing interference components has a large size and involves a large scale of signal processing because it has a multi-stage configuration for improving the effect of canceling interference components. As a result, a communication system utilizing such an interference cancellation method needs an apparatus of a large scale is required at a base station, thereby increasing cost.

It is an object of the invention to provide a communication system utilizing code division multiple access in which any increase in the scale of an apparatus at a base transceiver station in simultaneous communication with a plurality of radio mobile station apparatuses is prevented by providing an interference suppressing function for suppressing mutual interference attributable to an increase in the number of users of the communication.

It is another object of the invention to provide a low-cost communication system utilizing code division multiple access which enables prevention of any reduction of channel utilization communication with high quality.

In order to achieve the above objects according to the present invention, there is provided a base transceiver station for use in communication with a plurality of radio mobile station apparatuses based on code division multiple access. The base transceiver station comprises a reception signal interference canceller device. Further, the interference canceller device comprises: a slot configuration circuit for dividing a reception signal at certain time intervals, converting the divided signal into signals at a faster cycle and converting into a signal having a serial slot configuration as many the converted signals as stages for stage processing on a signal identical to the converted signals at a faster cycle; a correlation circuit for performing a despreading process on the signal having the slot configuration; a stage addition circuit for adding the number of stages for stage processing to the despread signals; a re-spreading circuit for performing a re-spreading process on the signals which have been subjected to the stage addition; a synthesis circuit for performing a process of synthesizing all of the spread signals which have been subjected to the re-spreading process to generate replica signals; and a subtraction process circuit for performing a subtraction process between the replica signals and the reception signals. By the base transceiver station, signals obtained by subtraction process for the replica signals and the reception signals are repeatedly fed back to the correlation circuit thereby to eliminate an interference component.

Further, the above objects can be achieved by dividing the reception signal at certain time intervals at the slot configuration circuit such that one of the divided signals partially overlaps another divided signal at a signal dividing point. The above objects can be achieved, with respect to the slot signal to be despread among the signals having a serial slot configuration, by allowing only a first slot to pass through and disallowing the rest of the slots to pass through before being inputted to the correlation circuit, and inputting into the correlation circuit the signal whose second slot and subsequent slots are subjected to an interference cancellation process and fed back.

Moreover, in order to achieve the above objects, there is provided the stage addition circuit which selects valid signals out of the despread signals inputted thereto, selects signals to be added, and selects signals to be re-spread, and further selects the despread signals for controlling the above selections and adding.

Furthermore, in order to achieve the above objects, there is provided the correlation circuit which comprises a shift register, despread code setting elements and a matched filter having an addition circuit in correlation detection for outputting a correlation value signal by sequentially shifting the reception signals inputted to the shift register to the subsequent stages, and meanwhile integrating with the despread code setting elements, and adding the integrated signals, the matched filter conducts correlation detection by switching despread codes set in the despread code setting element within the period during which the signals in the shift register are shifted to the subsequent stages, and performs a despreading process for a plurality of users.

In addition, in order to achieve the above object of the present invention, there is provided the path detection circuit which comprises: a selector for selecting pilot signal portions at the beginning of the correlation value signals outputted by the correlation circuit; an averaging circuit for performing an averaging process on the selected pilot signals among the slot signals; an accumulation circuit for performing accumulation of the averaged pilot signals and the slot signals in the subsequent stages; a forgetful averaging circuit for performing a forgetful averaging process between the accumulatively added signals and other accumulatively added signals in the subsequent stages; a path detection/peak detection circuit for detecting paths for the reception signals from the correlation value signals which have been subjected to the forgetful averaging process and detecting the peaks and positions of valid paths; and a despread signal detection circuit for detecting despread signals from the correlation value signals based on the information of valid paths detected by the path detection/peak detection circuit.

BRIEF DESCRIPTION OF THE DRAWINGS

FIG. 4 illustrates conversion of a reception signal into a signal having a slot configuration by a slot configuration circuit.

FIGS. 5A through 5C illustrate a method of allocating signals during a process at stages for canceling interference between slot configuration signals.

FIG. 9 is a process flow for eliminating interference component.

DETAILED DESCRIPTION OF PREFERRED EMBODIMENT

An embodiment of a communication system according to the invention will now be described in detail with reference to the drawings.

Figure 1:
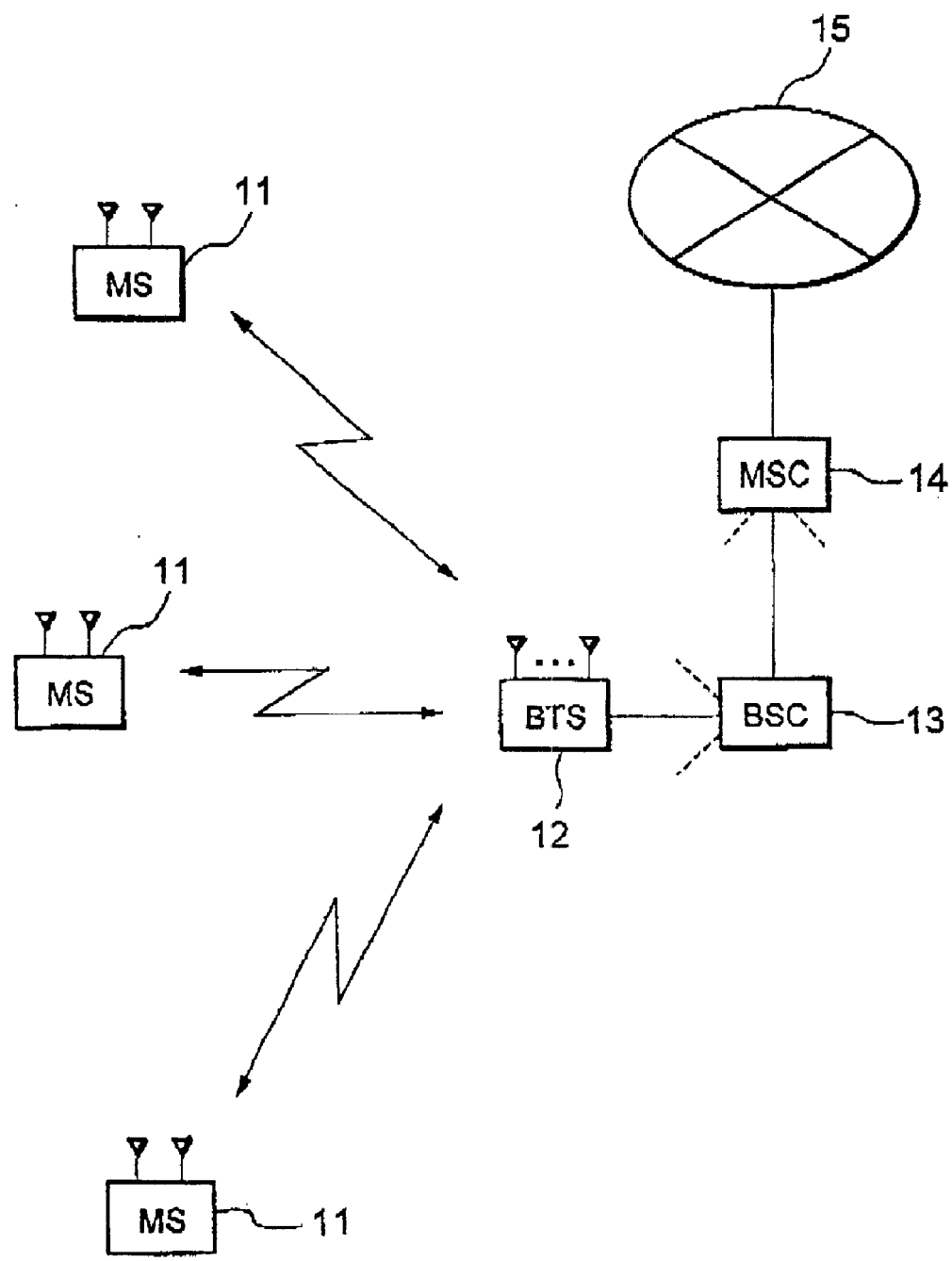
FIG. 1 is a block diagram showing a configuration of a communication system utilizing code division multiple access according to an embodiment of the invention.
Figure 2:
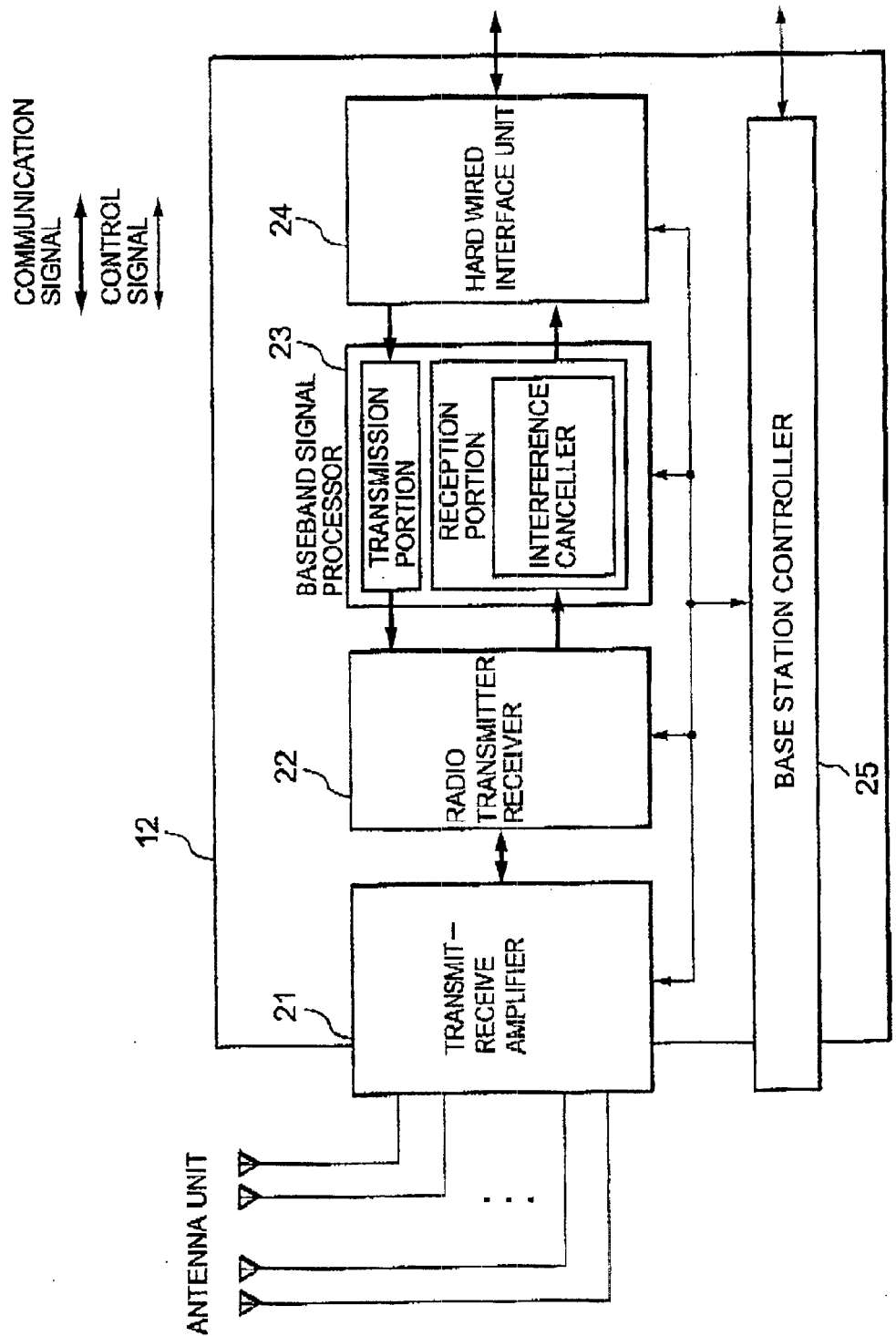
FIG. 2 is a block diagram showing a configuration of a base transceiver station apparatus having an interference canceller device.

FIG. 1 is a block diagram showing a configuration of a communication system utilizing code division multiple access according to an embodiment of the invention. FIG. 2 is a block diagram showing a configuration of a base transceiver station apparatus having an interference-canceling device. First, a schematic description will be made on configurations of the communication system and base transceiver station of the present embodiment. In FIGS. 1 and 2, 11 represents a mobile station (MS); 12 represents a base transceiver station (BTS); 13 represents a base station controller (BSC); 14 represents a mobile switching center (MSC): 15 represents a public switched telephone network; 20 represents an antenna unit; 21 represents a transmit-receive amplifier; 22 represents a radio transmitter receiver; 23 represents a baseband processor; 24 represents a hard wired interface unit; and 25 represents a base transceiver station controller.

As shown in FIG. 1, the mobile communication system to which the invention applied includes the mobile station apparatuses 11, the base transceiver station apparatus 12 which communicates with a plurality of the mobile stations 11 utilizing the code division multiple access method, the base station controller 13 which is connected to a plurality of the base transceiver station 12 to perform processes of selecting, synthesizing and distributing communication signals and control signals to perform a diversity hand-over process to the mobile stations 11 and the mobile switching center 14 which is connected to a plurality of the base station controllers 13 and other communication apparatuses to perform a process of exchanging communication signals, the system being connected to the public switched telephone network 15.

The base transceiver station apparatus 12 employs the code division multiple access method as its communication method and communicates with a plurality of radio mobile station apparatuses 11 existing within a radio area of the base transceiver station apparatus 12. A plurality of the base transceiver station apparatuses 12 which are mobile terminal users communicate using the same frequency and frequency band. Since each communication uses a different code, each communication is performed on a divided basis. Processes such as power control are performed at the base transceiver station apparatuses in order to solve the far-and-near problem that occurs when a strong communication signal from a mobile terminal user located close to a base transceiver station apparatus 12 overlaps a weaker communication signal from a mobile terminal user located further.

The base station controller 13 is connected to a plurality of the base transceiver station apparatuses 12. The base station controller 13 performs a process of selecting and synthesizing communication signals and control signals from each of the base transceiver station apparatus 12 and a process of distributing communication signals and control signals to each base transceiver station apparatus 12. The base station controller 13 also performs a diversity handover process for switching communication signals between base transceiver station apparatuses when a radio mobile station apparatus 12 moves from a radio area covered by one base transceiver station apparatus 12 to another radio area covered by another base transceiver station apparatus.

As shown in FIG. 2, the base transceiver station apparatus 12 comprises an antenna unit 20, a transmit-receive amplifier 21, a radio unit 22, a baseband processor 23, a hard wired interface unit 24 and a base transceiver station control unit 25.

The antenna unit 20 for transmitting and receiving radio signals has two transmission/reception antenna systems for one communication area in order to perform diversity reception. When the base transceiver station apparatus is adapted to process a plurality of sectors, the antenna unit 20 has a plurality of antennas in accordance with the number of the sectors.

The transmit-receive amplifier 21 has a transmission amplifier for amplifying transmission radio signals and a low-noise amplifier for amplifying reception radio signals. The transmit-receive amplifier 21 divides and multiplexes radio transmission signals and radio reception signals.

The radio unit 22 has a radio transmission portion and a radio reception portion. The radio transmission portion performs D-A conversion on transmission signals which have been subjected to baseband signal processing, converts the resultant signal into radio frequency signals after orthogonal modulation, and transmits the radio frequency signals to the transmission amplifier of the transmit-receive amplifier 21. The radio reception portion converts reception signals from the reception amplifier into baseband signal frequencies, performs A–D conversion on the resultant signals after quasi-synchronous detection, and transmits the resultant signal to the baseband processor 23.

The baseband processor 23 has a baseband transmission portion and a baseband reception portion. The baseband transmission portion performs signal processing such as transformation of transmission data into error correction codes, framing, data modulation and spread modulation. The baseband reception portion has an interference canceller device 23a and performs signal processing such as synchronization of reception of signals from the radio unit 22, despreading, an interference suppressing process, decoding of error correction codes, multiples division of data, synthesis of sectors at a maximum ratio during diversity handover.

The hard wired interface unit 24 is an interface unit for an inter-station transmission channel between the base transceiver station apparatus 12 and the base station controller 13. The hard wired interface unit 24 transmits and receives communication signals to and from the base station controller 13.

The base transceiver station control unit 25 transmits and receives control signals to and from the base station controller 13 and performs processes such as management, setting and opening of radio lines.

A detailed configuration and operation of the interference canceller device 23a in the base transceiver station apparatus 12 will now be described with reference to the drawings.

In FIG. 3 and FIGS. 6 through 8, 101 represents a synchronization process/initial path detection circuit; 102, 113, 114 and 404 represent delay circuits; 103 represents a slot signal configuration circuit; 104, 107, 109, 401, 403, 405, 504 and 601 represent selectors; 105 represents a correlation circuit; 106 represents a path detection circuit; 108 represents a code generation circuit; 110 represents a re-spreading circuit; 111 represents a synthesis circuit; 112 represents a subtraction process circuit; 115 represents a stage process circuit; 116 represents a demodulation circuit; 402 represents an adder; 501 represents a shift register; 502 represents a despreading code setting element; 503 represents an addition circuit; 505 represents a control unit; 506 represents a matched filter; 602 represents an averaging circuit; 603 represents an accumulation process circuit; 604 represents a forgetful averaging process circuit; 605 represents a despread signal detection circuit; and 606 represents a path detection/peak detection circuit.

Figure 3:
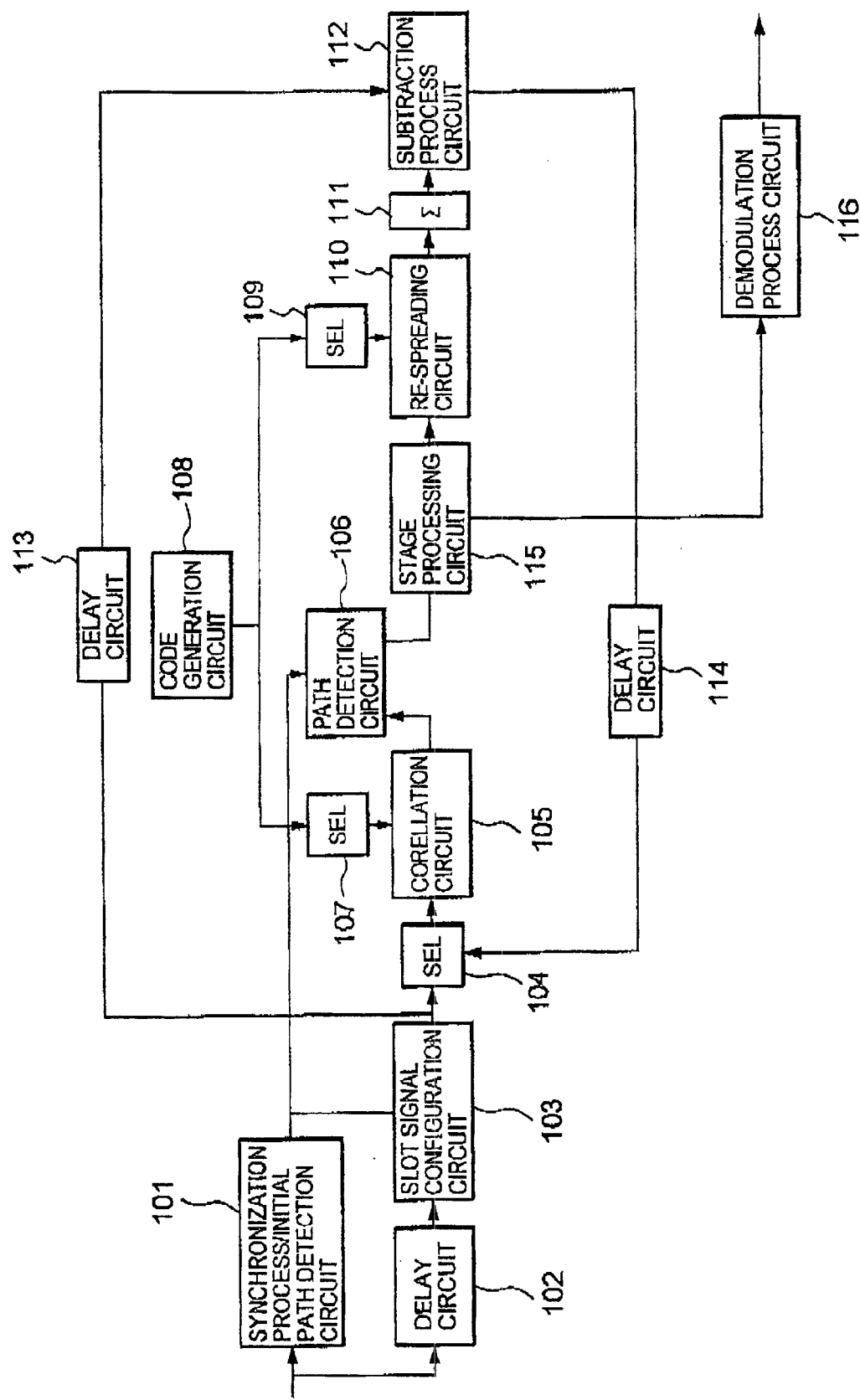
FIG. 3 is a block diagram showing a configuration of the interference canceller device.

As shown in FIG. 3, the interference canceller device 23a provided in the base transceiver station apparatus 12 comprises the synchronization process/initial path detection circuit 101 for performing a process of synchronizing multiwave signals received at the radio reception portion and detection of the position of an initial path, the delay circuit 102 for causing a delay to reflect the result of the path detection upon the division of a signal, the slot signal configuration circuit 103 for dividing at certain time intervals a reception signal for which path detection has been performed to convert the signal into signals having a slot configuration, the selector 104 for selecting the slot signals, the correlation circuit 105 for performing a despreading process on the signals having a slot configuration, the path detection circuit 106 for detecting a path for an interference suppression signal; the stage addition circuit 115 for adding the number of stages of stage processing to a despread signal on which has been subjected to the despreading process, the re-spreading circuit 110 for performing a process of re-spreading the signal which has been subjected to the stage addition, the synthesis circuit 111 for performing a synthetic process on all signals which have been subjected to the re-spreading process to generate replica signals, the subtraction process circuit 112 for performing a process of subtracting the replica signals as a result of the synthetic process from reception signals, the code generation circuit 108 for generating codes for the despreading and re-spreading processes, the selectors 107 and 109 for switching those codes and the demodulation circuit 116 for performing a demodulation process on signals on which interference cancellation has been performed.

A reception signal inputted to the interference canceller device 23a is a reception signal which has been subjected to the synchronization process and path detection on a multiwave signal which has been received by the radio unit 22. The slot signal configuration circuit 103 divides the reception signal at certain time intervals to convert it into signals at a faster cycle and further converts them into signals having a serial slot configuration. The signals configured into slots have a configuration in which the signals equal to the divided signals are located repeatedly. Some of the signals having a slot configuration are inputted to the subtraction processing unit 112 through the delay circuit 113 as they are in the slot configuration in which the signals are located repeatedly. The rest of the signals having a slot configuration are inputted to the selector 104. The selector 104 performs a process of allowing only the signal in the first slot to pass therethrough and disallowing the remaining slots to pass therethrough. The signals processed by the selector 104 are input to the subsequent processing circuit for performing the interference cancellation process.

The signals only whose first slots have passed are inputted to the correlation circuit 105 for performing the despreading process. The correlation circuit 105 performs the process of the correlation detection process and re-spreading process on the multiplex input signals in a number of times equivalent to the number of users. The despread signals are inputted to the re-spreading circuit 110, as they are in the slot configuration, through the path detection circuit 106 and stage processing circuit 115. After the re-spreading circuit 110 generates re-spread signals, the synthesis circuit 111 synthesizes the re-spread signals of all of the users to generate replica signals. The replica signals are inputted to the subtraction process circuit 112. At the subtraction process circuit 112, a subtraction process is performed between the replica signals and the signals having the slot configuration of repeated signals input from the delay circuit 113. The signals resulting from the subtraction process are fed back to the correlation circuit 105 through the delay circuit 114 and the selector 104.

A despreading process is similarly performed on the signals fed back to the correlation circuit 105 which have been subjected to the subtraction process. For example, the feedback to the correlation circuit 105 is carried out at timing of which the signal in the first slot becomes the signal in the second slot if it is processed and fed back. Therefore, the interference canceller device 23a can process the signals continuously. A re-spreading process and a synthesis process similar to those described above are performed also on the signal in the second slot which has been fed back and subjected to the despreading process to generate a replica signal. This replica signal is also fed back to the correlation circuit 105 after being subjected to the subtraction process as described above. The fed back signal becomes the signal in the third slot. As thus described, the interference canceller device 23a performs the same process repeatedly to achieve a multi-stage type interference canceling function. This makes it possible to improve the effect of suppressing interference components.

As described above, the process at the multi-stage interference canceller of the present embodiment utilizes signals having a serial slot configuration which are generated by dividing a reception signal at certain time intervals. The signals converted into a slot configuration are subjected to the despreading process at the correlation circuit. The signals in a slot configuration are discrete signals because they are obtained by dividing a continuous signal into slots. Therefore, if the divided signals are located in slots as they are, the correlation circuit is unable to perform the demodulation process at the discontinuities. Under such circumstances, according to the present embodiment, the slot configuration circuit 103 performs the process described below in order to allow the correlation circuit to perform demodulation in the same way as performed on a continuous signal even at the discontinuities.

A description will now be with reference to FIG. 4 on how a reception signal is converted by the slot configuration circuit 103 into signals in a slot configuration.

The received signal is a signal, from a lo of subscribers of radio mobile station apparatuses 11, which has been subjected to code division multiplexing. The slot configuration circuit 103 divides such a reception signal 201 at certain time intervals which are arbitrarily set to convert it into signals having a faster cycle and thereafter converts the resultant signals into signals in a serial slot configuration. Such signal conversion is performed such that the above-described signals divided at certain time intervals are arranged as m similar signals at a higher speed at the same time intervals as described above to provide signals 202 having a slot configuration.

Since the reception signal 201 is divided at certain time intervals which are arbitrarily set, signals from the subscribers of the radio mobile station apparatuses 11 become discrete signals. It is inconvenient if the converted slot signals 202 as a result of the conversion can not be subjected to the despreading process at the correlation circuit at the discontinuities. Therefore, in this embodiment of the present invention, the following process is performed to allow the correlation circuit to perform the despreading in the same manner as performed on a continuous signal even at the discontinuities. Specifically, in an example shown in FIG. 4, the reception signal 201 is divided into a reception signal F and a reception signal E. At this time, the signal is divided such that the reception signals E and F have an overlapping portion 201a. The divided signals E and F are in a configuration in which m signals similar to the divided signals are repeatedly located as apparent from the slot signal 202. "m" represents the number of the stages of the stage processing for canceling interference. The effect of interference cancellation becomes more significant, the greater the number of the stages. However, since the time required for the process increases with the number of the stages, a value optimum for the system is set in consideration to the effect of interference cancellation and the processing time.

Referring to the process at the interference canceller of the present embodiment, stage processing for canceling interference is carried out by performing a despreading process on a reception signal located in the first slot of a signal having a slot configuration and performing a despreading process on a feedback signal located in the second slot. A configuration is employed in which the gain of the stage processing on data obtained after the despreading process is improved by accumulating at each stage the despread signal obtained by despreading at each slot. The circuit for accumulating despread signals at each stage of the stage processing has a configuration in which selector circuits are provided at a signal input/output portion to allow selection of signals to be added and signals to be transmitted to the subsequent stage. When only a small number of stages are sufficient because of reasons such as a small number of multiplexing, the number of the stages for stage processing can be changed by switching the selectors without changing the slot configuration. By selecting signals to be transmitted to the subsequent stage with the selectors, it is possible to select signals which can be used as modulation signals for generating replica signals.

A description will now be made with reference to FIG. 5 on the process at the above-described stages for canceling interference.

A signal which has been converted by the slot configuration circuit 103 into a signal 202 having a slot configuration is divided into two signals. One of the signals is inputted to the subtraction process circuit 122 as it is in the slot configuration to perform the subtraction process. The other signal becomes a signal 301 selected by the selector 104 and is inputted to the correlation circuit 105. As shown in FIG. 5B, the signal 301 is has a signal only in the first slot. Thereafter, the signal which has passed through the selector 104 is subjected to the despreading process at the correlation circuit 105, the re-spreading process at the re-spreading circuit 110, the synthetic process at the synthesis circuit 111 and the subtraction process at the subtraction process circuit 112. The signal which has been subjected to the subtraction process passes through the delay circuit 114 to be fed back to the correlation circuit 105 again. As shown as a signal 302 in FIG. 5C, the fed back signal is located in the second, third and subsequent slots.

The fed back signal is subjected to the despreading process at the correlation circuit 105 again. The stage processing circuit 115 performs a process of adding the despread signals to the demodulated data in the slots. The process of adding the despread signals will now be described with reference to FIG. 6A and FIG. 6B.

Figure 6A:
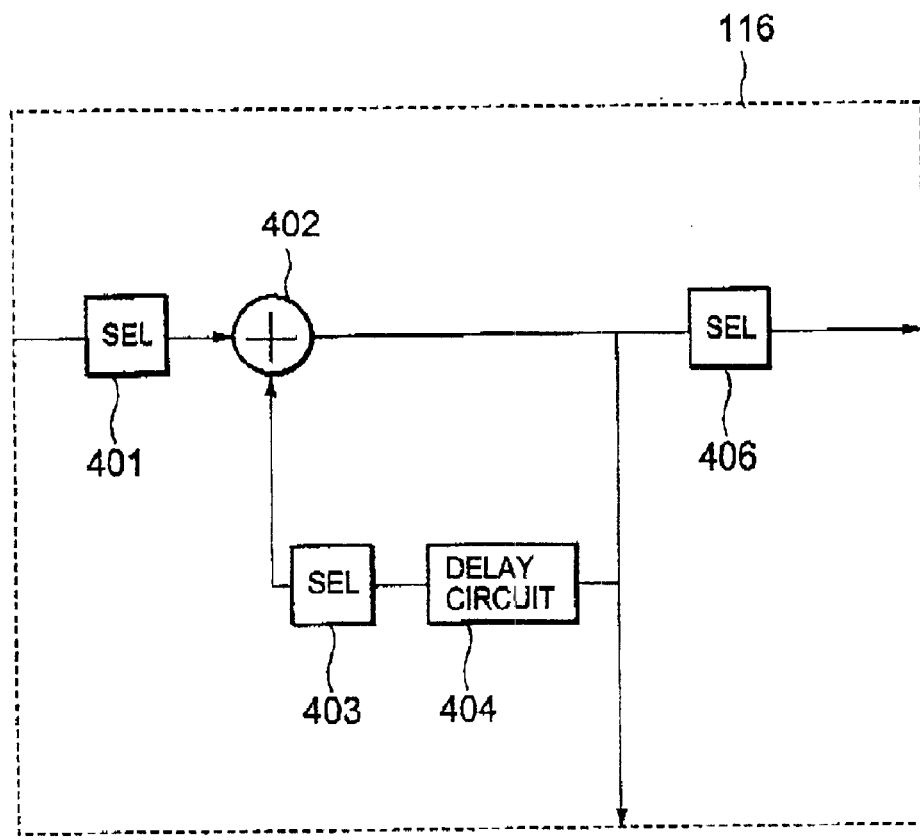
FIGS. 6A and 6B illustrate a configuration of a stage process circuit and a process of adding despread signals at the same circuit.
Figure 6B:
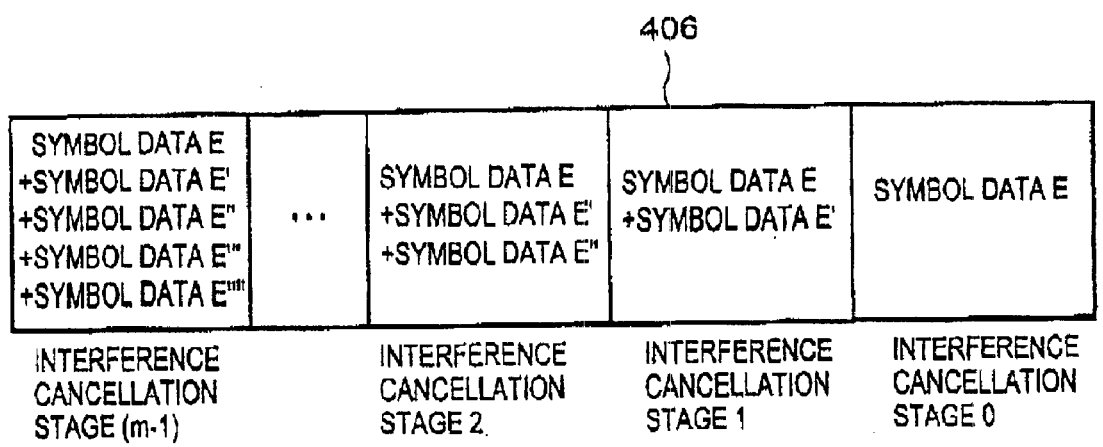

As shown in FIG. 6A, the stage processing circuit 115 comprises the selector 401, the adder 402, the selector 403, the delay circuit 404 and the selector 405. The adder 402 and delay circuit 404 accumulatively add a despread signal inputted thereto with the despread signal in the preceding slot. As a result, a signal obtained by accumulatively adding thereto despread signals outputted by the stage processing circuit 115 is as indicated by 406 in FIG. 6B. The signal to which a multiplicity of despread signals have been accumulatively added is a signal from which interference has been canceled. Through a demodulation process on such a signal, the signal is demodulated into a signal from which interference has been canceled.

In the past, the number of the correlation circuits 105 has been required in the same quantity as the number of users for whom demodulation is to be carried out. This embodiment of the present invention has a configuration in which a plurality of user signals can be demodulated with a single correlation circuit using an elaborate method for signal processing. The configuration of the embodiment of the present intention makes it possible to decrease the number of correlation circuits which has conventionally increased with the number of users.

Reception signals inputted to the correlation circuit are inputted to a shift register and are sequentially shifted to subsequent shift registers. The correlation circuit multiplies the reception signals with codes for despreading and calculates the sum of the results of the multiplication to output a correlation value. It performs the process continuously to demodulate the signals. The codes for despreading are generated by the code generation circuit 108, and a code required for demodulating each user signal is separately generated. The generated despreading codes are set in the code setting elements of the correlation circuit to perform a demodulation process. The method of setting the codes is characteristic of the present invention.

Normally, the reception signals are different from despreading codes in the number of delay stages of the shift registers, because the reception signals are oversampled. However, the reception signals and despreading codes are shifted to subsequent steps in synchronism with each other. As a result, although they each have the identical reception signal to be inputted to the correlation circuit, the same number of the correlation circuits is necessary as that of users for whom demodulation is carried out, because a despreading code to be set is different among users. Under such circumstances, the embodiment of the present invention employs a configuration in which the codes set in the code setting elements of the correlation circuit can be instantaneously switched within the time during which a reception signal is set in a shift register and is shifted once to the subsequent shift register. This makes it possible to switch the setting of despreading codes for all user signals, thereby enabling a despreading process on a plurality of user signals. When a configuration is employed in which output of demodulated signals is also instantaneously switched in synchronism with the switching of the codes to be set, correlation value signals obtained by detecting correlation between a plurality of users can be outputted concurrently. It is therefore possible to perform a despreading process on a plurality of user signals with one correlation circuit.

Figure 7:
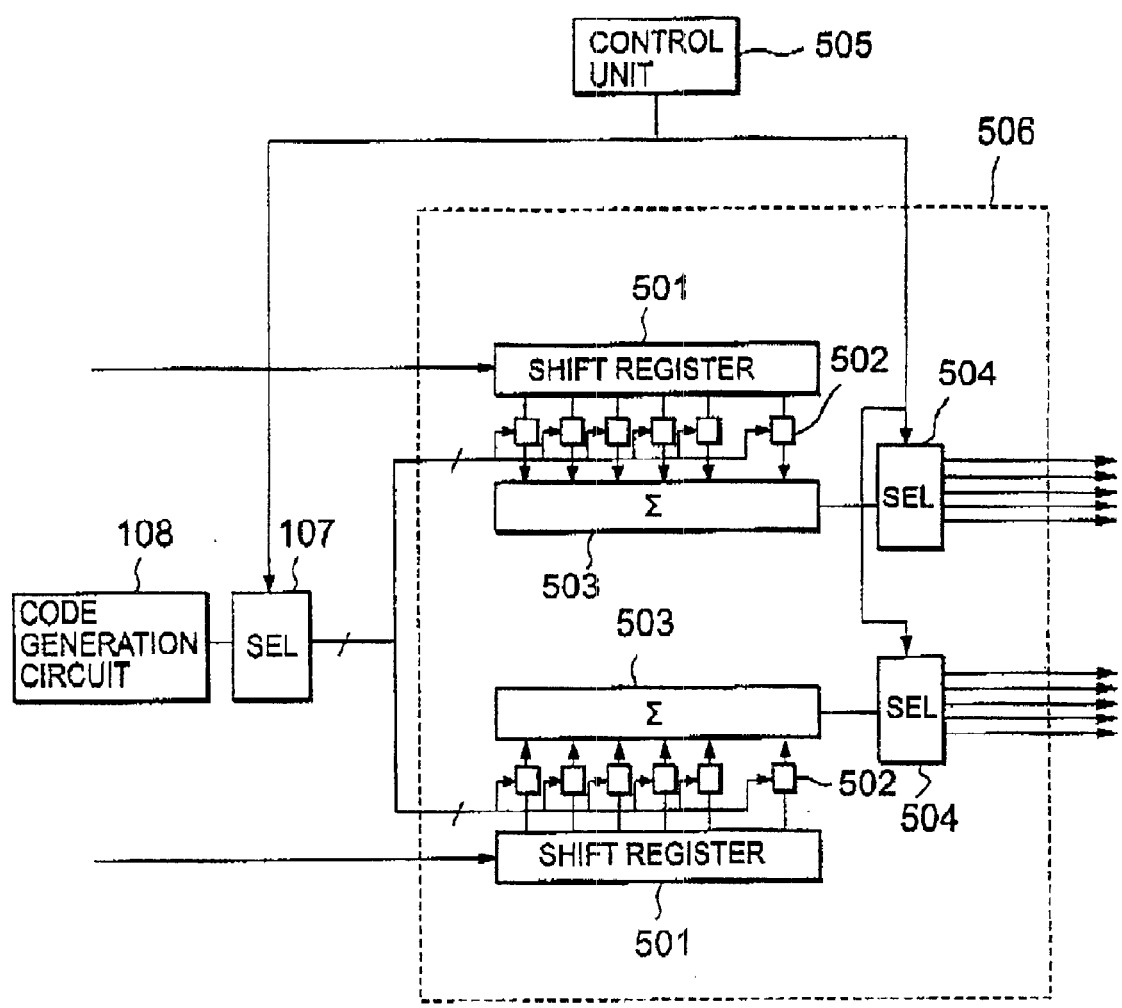
FIG. 7 is a block diagram illustrating a configuration of a correlation circuit of the interference-canceling device.

A configuration and operation of the above-described correlation circuit 105 will now be described with reference to FIG. 7.

The correlation circuit 105 comprises shift registers 501, despreading code setting elements 502, addition circuits 503 and selectors 504 as a matched filter 506. As is well known, since a signal obtained by converting the frequency of a reception signal into that of a baseband signal is divided into an I-axis signal and a Q-axis signal, two sets of the above-described configuration are provided as the matched filter 506. The matched filter 506 is connected to a code generator 108 for generating codes for setting despreading codes, a selector 107, and a control unit 505 for controlling the switching of the selector 107.

The code generator 108 generates on a user-by-user basis despreading codes for demodulation for demodulating the reception signal. Those despreading codes are sequentially switched at a high speed by the selectors 107 and are set in the spreading code setting elements 502. The control unit 505 controls the switching of the selectors 504 for switching the output of correlation values simultaneously with the switching of despreading code setting. The same number of signal lines as that of users for whom the despreading process can be performed are connected to the output side of the selectors 504. By switching the selectors 504, signals obtained after correlation value processing are concurrently outputted at the output of the correlation circuit 105 in a quantity equivalent to the number of users for whom demodulation is to be performed.

The path detection circuit 106 used in the multi-stage interference canceller device in the present embodiment of the invention can detect paths using signals which has been correlation-detected and subjected to stage processing for canceling interference. Normally, synchronous process and path detection of reception signals, and path are performed at the beginning of reception, and a despreading process is performed based on the resultant data. In the case of a radio communication system based on the code division multiple access, however, fine power control is carried out between the base stations and mobile stations to control transmission power such that the SIR, i.e., the ratio between the power of transmission signal power and reception-interfering power is always maintained at a constant value. Therefore, when interference components are suppressed by an interference canceller, a power control signal is transmitted to a transmitter side for reducing the power. As a result, the power of reception signals gradually decreases. Since the interference suppressing effect of an interference canceller reduces the power of reception signals gradually, it becomes difficult to detect. paths with only the synchronization process at the initial stage and the path detection circuit.

Under such circumstances, the path detection circuit 106 used in the embodiment of the present invention is configured to be able not only to perform synchronous process and path detection at the beginning of reception, with a normal path detection circuit but also to perform path detection from signals whose interference components have been suppressed by the interference canceller. Specifically, a path detection signal at the initial stage is used to perform a despreading process on the first signal in the first slot. A correlation value signal obtained by the despreading process on the signal in the first slot is used for the signal in the second slot. A correlation value signal obtained by adding the correlation value signal for the first slot and the correlation value signal for the second slot is used to perform the despreading process on the signal in the third slot. It is a correlation value signal at the first stage for interference cancellation which has been subjected to the interference cancellation process. Similarly, a correlation value signal at the second stage for interference cancellation which is obtained by adding the correlation value signals for the first, second and third slots is used for despreading the signal in the fourth slot. By repeating the same process, correlation value signals which have been subjected to the stage processing for interference cancellation can be used to detect paths for the subsequent slots. Such signals which have been subjected to the stage processing for interference cancellation are stored in a memory and are used for averaging process with the data at the subsequent stages, which makes it possible to perform path detection which is resistant to phasing and which is more accurate.

Figure 8:
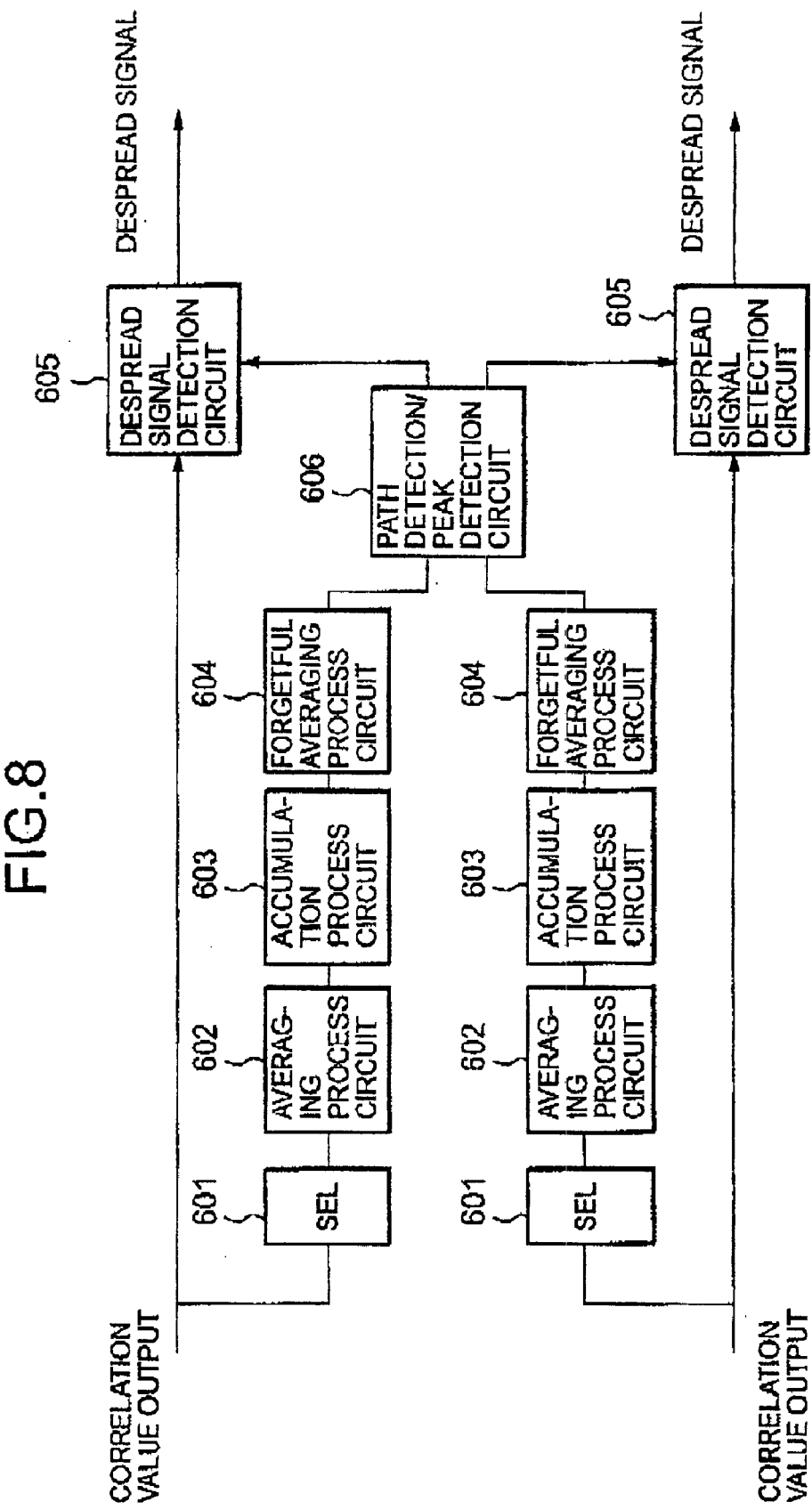
FIG. 8 is a block diagram illustrating a configuration of a path detection circuit of the interference-canceling device.

A configuration and operation of the above-described path detection circuit 106 will now be described with reference to FIG. 8.

The path detection circuit 106 comprises selectors 601, averaging circuits 602, accumulation circuits 603, forgetful averaging circuits 604, a path detection/peak detection circuit 606 and despread signal detection circuits 605. In this circuit, two sets of above-described features are provided in association wit I-axis signals and Q-axis signals except for the path detection/peak detection circuit 606. The selectors 601 selects required demodulation signals from among signals from the correlation circuit 105 and selects only pilot signal portions out of the demodulation signals. The averaging circuits 602 average pilot signals in one slot.

A correlation value signal of pilot signals which are averaged in each slot is accumulatively added by the accumulation circuits 603 with an averaged correlation value signal of each of the subsequent slots wherein a stage processing has been performed by the addition circuits to provide a correlation value signal which has been subjected to stage processing for interference cancellation. The correlation value signal which has been subjected to stage processing for interference cancellation is averaged at the forgetful averaging circuits 604 with several correlation value signals which have been subjected to stage processing for interference cancellation. The path detection/peak detection circuit 606 uses the correlation value signal obtained through the stage processing for interference cancellation to detect paths for reception signals and detect a peak of a path for symbol demodulation. Based on information of paths whose peaks have been detected by the path detection/peak detection circuit 606, symbol demodulation data are extracted from correlation value data outputted by the correlation circuit 105.

FIG. 9 shows a process flow for eliminating interference component according to this embodiment. First, received is a signal transmitted by a mobile station. (S101) Then, the reception signal is divided at certain tire intervals and the divided signal is converted into a signal at a faster cycle. The thus obtained signals are converted into a signal having a serial slot configuration and including as many signals identical to the thus obtained signals as the number of stages for stage processing. (S102) This signal having the slot configuration is processed for eliminating the interference component. Specifically, the signal having the slot configuration and a feedback signal are despread, and the number of stages for stage processing is added to the despread signal obtained by the despreading process. Then, the signal obtained by the above stage addition process is re-spread and all of the spread signals obtained by the re-spreading process is synthesized for generating replica signals. Between the replica signals and the reception signals, a subtraction process is carried out for generating the feedback signal, consequently outputting signals obtained after the stage addition process.

According to the above-described embodiment of the invention, signal processing is performed by providing feedback of signals which have been subjected to stage processing for interference cancellation. This is advantageous in that hardware which has been required in a quantity equivalent to the number of stages can be significantly reduced while allowing signal processing similar to conventional stage processing using cascade connection.

The above-described embodiment of the invention makes it possible to demodulate a plurality of user signals with a single correlation circuit by switching despreading codes at a high speed and by switching synchronization of outputs while the correlation circuit has been required in a quantity equivalent to the number of users for whom demodulation is to be performed. This is advantageous in that the number of correlation circuits can be reduced.

Furthermore, the above-described embodiment of the invention is advantageous in that the interference cancellation process reduces the amount of interference of demodulation signals and in that paths for reception signals can be detected even when receiving power is reduced as a result of power control, thereby allowing a greater number of reception signals to be multiplexed.

EFFECTS OF THE INVENTION

As described above, in the base transceiver station apparatus simultaneously communicating with a plurality of mobile station apparatuses, the present invention controls scale-up of the apparatus due to the provision of interference suppressing function which suppresses mutual correlation interference caused by the increase of users. Further, in accordance with the present invention, obtainable is a low-cost communication system employing a code division multiple access, which prevents the reduction of channel utilization efficiency and enables a high-quality communication.

What is claimed is:

1. A base transceiver station for use in communication with a plurality of radio mobile station apparatuses based on code division multiple access, comprising a reception signal interference canceller device, the interference canceller device comprising:

a slot configuration circuit for dividing a reception signal at certain time intervals, such that one of the divided signals partially overlaps another divided signal at a signal dividing point, converting the divided signal into signals at a faster cycle and converting into a signal having a serial slot configuration as many the converted signals as stages for stage processing on a signal identical to the converted signals at a faster cycle;

a correlation circuit for performing a despreaditig process on the signal having the slot configuration;

a stage addition circuit for adding the number of stages for stage processing to the despread signals;

a re-spreading circuit for performing a re-spreading process on the signals which have been subjected to the stage addition;

a synthesis circuit for performing a process of synthesizing all of the spread signals which have been subjected to the re-spreading process to generate replica signals; and a subtraction process circuit for performing a subtraction process between the replica signals and the reception signals, wherein signals obtained by subtraction process for the replica signals and the reception signals are repeatedly fed back to the correlation circuit thereby to eliminate an interference component.

2. A base transceiver station:
for use in communication with a plurality of radio mobile station apparatuses based on code division multiple access, comprising a reception signal interference canceller device.

the interference canceller device comprising:

a slot configuration circuit for dividing a reception signal at certain time intervals, converting the divided signal into signals within a plurality of slots at a faster cycle and converting into a signal having a serial slot configuration as many the converted signals as stages for stage processing on a signal identical to the converted signals at a faster cycle, and wherein only a first slot of the plurality of slots thereof is allowed to pass through and the rest of the slots is disallowed to pass; and the signal whose second slot and subsequent slots are subjected to an interference cancellation process and then fed-back, is inputted into a correlation circuit;

the correlation circuit for performing a despreading process on the signal having the slot configuration;

a stage addition circuit for adding the number of stages for stage processing to the despread signals;

a re-spreading circuit for performing a re-spreading process on the signals which have been subjected to the stage addition;

a synthesis circuit for performing a process of synthesizing all of the spread signals which have been subjected to the re-spreading process to generate replica signals; and a subtraction process circuit for performing a subtraction process between the replica signals and the reception signals, wherein signals obtained by subtraction process for the replica signals and the reception signals are repeatedly fed back to the correlation circuit thereby to eliminate an interference component.

3. A base transceiver station for use in communication with a plurality of radio mobile station apparatuses based on code division multiple access, comprising a reception signal interference canceller device, the interference canceller device comprising:

a slot configuration circuit for dividing a reception signal at certain time intervals, converting the divided signal into signals at a faster cycle and converting into a signal having a serial slot configuration as many the converted signals as stages for stage processing on a signal identical to the converted signals at a faster cycle;

a correlation circuit for performing a despreading process on the signal having the slot configuration;

a stage addition circuit for adding the number of stages for stage processing to the despread signals and for selecting valid signals out of tile despread signals inputted thereto, selecting signals to be added, and selecting signals to be re-spread and further selecting the despread signals for controlling selections thereof and adding;

a re-spreading circuit for performing a re-spreading process on the signals which have been subjected to the stage addition;

a synthesis circuit for performing a process of synthesizing all of the spread signals which have been subjected to the re-spreading process to generate replica signals; and a subtraction process circuit for performing a subtraction process between the replica signals and the reception signals, wherein signals obtained by subtraction process for the replica signals and the reception signals are repeatedly fed back to the correlation circuit thereby to eliminate an interference component.

4. A base transceiver station wherein:
for use in communication with a plurality of radio mobile station apparatuses based on code division multiple access, comprising a reception signal interference canceller device, the interference canceller device comprising:

a slot configuration circuit for dividing a reception signal at certain time intervals, converting the divided signal into signals at a faster cycle and converting into a signal having a serial slot configuration as many the converted signals as stages for stage processing on a signal identical to the converted signals at a faster cycle;

a correlation circuit for performing a despreading process on the signal having the slot configuration and having a shift register, despread code setting elements and a matched filter having an addition circuit; and in correlation detection for outputting a correlation-value signal by sequentially shifting the reception signals inputted to the shift register to the subsequent stages, and meanwhile integrating with the despread code setting elements, and adding the integrated signals, the matched filter conducts correlation-detection by switching despread codes set in tile despread code setting element within the period during which the signals in the shift, register are shifted to the subsequent stages, and performs a despreading process for a plurality of users;

a stage addition circuit for adding the number of stages for stage processing to the despread signals:

a re-spreading circuit for performing a re-spreading process on the signals which have been subjected to the stage addition;

a synthesis circuit for performing a process of synthesizing all of the spread signals which have been subjected to the re-spreading process to generate replica signals; and a subtraction process circuit for performing a subtraction process between the replica signals and the reception signals, wherein signals obtained by subtraction process for the replica signals and the reception signals are repeatedly fed back to the correlation circuit thereby to eliminate an interference component.

* * * * *